(12) United States Patent
Tada

(10) Patent No.: US 6,440,020 B1
(45) Date of Patent: Aug. 27, 2002

(54) BLADE-TYPE CHAIN TENSIONER

(75) Inventor: Naosumi Tada, Nabari (JP)

(73) Assignee: Borg-Warner Automotive, K.K., Nabari (JP)

( * ) Notice: Subject to any disclaimer, the term of this patent is extended or adjusted under 35 U.S.C. 154(b) by 0 days.

(21) Appl. No.: 09/599,153

(22) Filed: Jun. 21, 2000

(30) Foreign Application Priority Data

Jul. 22, 1999 (JP) .......................................... 11-207816

(51) Int. Cl.$^7$ ................................................. F16H 7/08
(52) U.S. Cl. ...................................... 474/111; 474/140
(58) Field of Search ................................ 474/101, 109, 474/111, 136, 138, 140

(56) References Cited

U.S. PATENT DOCUMENTS

| | | | |
|---|---|---|---|
| 3,490,302 A | 1/1970 | Turner et al. | 74/242.11 |
| 4,921,472 A | 5/1990 | Young | 474/111 |
| 5,184,982 A | 2/1993 | Shimaya et al. | 474/101 |
| 5,266,066 A | 11/1993 | White | 474/111 |
| 5,462,493 A | 10/1995 | Simpson | 474/111 |
| 5,797,818 A | * 8/1998 | Young | 474/111 |
| 5,957,793 A | 9/1999 | Schulze | 474/101 |
| 5,984,815 A | * 11/1999 | Badderia | 474/111 |

FOREIGN PATENT DOCUMENTS

| | | | |
|---|---|---|---|
| EP | 0 856 686 A2 | 8/1998 | F16H/7/18 |
| GB | 155646 | 12/1920 | |
| GB | 505746 | 5/1939 | |
| JP | 52-31278 | * 3/1977 | 474/111 |
| JP | 57-134055 | 8/1982 | F16H/7/08 |
| JP | 60-155046 | * 8/1985 | 474/111 |

OTHER PUBLICATIONS

European Search Report dated Feb. 21, 2001 for EP Applc. No. 00306200.7–2306.

* cited by examiner

Primary Examiner—Thomas R. Hannon
Assistant Examiner—Vicky A. Johnson
(74) Attorney, Agent, or Firm—Sidley Austin Brown & Wood; Hugh A. Abrams; Greg Dziegielewski

(57) ABSTRACT

A blade-type chain tensioner includes a blade shoe having a chain sliding face, a blade spring biasing the blade shoe toward an associated chain, and a bracket to rotatably support the fixed end of the blade shoe. The length of the blade spring is shorter than that of the chain sliding face of the blade shoe. The first end of the blade spring is attached onto the fixed end of the blade shoe and slidably contacts the distal end of the bracket at a contact point located between the fixed and free ends of the shoe.

8 Claims, 6 Drawing Sheets

BLADE-TYPE CHAIN TENSIONER

BACKGROUND OF THE INVENTION

This invention relates to a blade-type tensioner having a blade shoe with a chain sliding face and a blade spring for application of spring force onto the blade shoe.

FIG. 6 shows one example of a conventional blade tensioner, used for tensioning an associated chain. As shown in the figure, conventional blade tensioner 100 includes a blade shoe 101 of resin that extends in a curved line form, multiple blade springs 102 that extend along blade shoe 101 and are attached onto the blade shoe, and a metal bracket 120 as the bracket member that supports blade shoe 101.

Projection 110, having curved face 110a, is formed at the tip of blade shoe 101 and the projection 110 has concavity 111 that stores one end of blade spring 102. A nearly triangular projection 112 is formed at the fixed end end of blade shoe 101 and a concavity 113, that stores the other end of blade spring 102, is formed in the projection 112.

Holes for attaching, 121, 122, are formed in bracket 120. Sliding face 125, on which projection 110 at blade shoe tip 101 can contact and slide, is formed at the tip of bracket 120. One end of pin 130 is fixed at the center of bracket 120. Projection 112, as the fixed end side of blade shoe 101, is inserted rotatably onto pin 130.

During. operation of the chain, the chain runs on sliding face 101a of blade shoe 101 and the press-down load, due to blade shoe 101 and deformation of blade spring 102, acts on the chain at such time. The conventional blade tensioner is used where the center-to-center distance of the chain is relatively short, such as a chain to drive the oil pump of an engine. On the other hand, because of the demand to lower the cost of the engine, it is desired to use a blade tensioner of relatively low manufacturing cost, for a cam chain that drives between the crankshaft and the camshaft.

In the case of a cam chain, the center distance is long, generally, so that the length of the blade tensioner needs to be long to match the center distance. However, when the total length of the blade tensioner is long, the resonant frequency becomes low due to its lower natural frequency and, as a result, the blade tensioner resonates within the rpm range of the engine and fatigue damage can occur.

This invention addresses such a conventional problem. The objective is to offer a blade tensioner that can prevent resonance in the rpm range and fatigue damage.

SUMMARY OF THE INVENTION

It is a first aspect of the invention to provide a blade tensioner which applies tension to a chain. The tensioner includes a blade shoe with a chain sliding face, a blade spring that applies the spring force to the blade shoe and a bracket upon which to attach the blade shoe. A fixed end, portion, or proximal end of the blade shoe is rotatably attached to the bracket. The blade spring contacts the tip or distal end of the bracket at a contact point located between the free end and the fixed end of the blade shoe.

In this invention, the chain runs on the chain sliding face of the blade shoe. Proper tension is applied to the chain by the action of the blade shoe activated by the force of the deformed blade spring. The natural frequency of the blade tensioner is determined by the location where the tip of the bracket and the blade spring come into contact. As the contact point between the spring and the bracket moves toward the tip of the blade shoe, the natural frequency of the shoe becomes lower. On the other hand, as the contact point moves toward the fixed end of the blade shoe, the natural frequency of the shoe and tensioner becomes higher. The objective is to raise the natural frequency of the blade tensioner higher than the frequency of vibrations generated by the engine.

In the present invention, the location of the contact point between the tip portion of the bracket and blade spring or blade shoe is located between the blade shoe tip or free end and its fixed end, so that the natural frequency of the blade tensioner is made relatively high. Thereby, the resonant frequency of the blade tensioner can be set relatively high compared to those frequencies generated by the engine and, as a result, the resonance of the blade tensioner within the rpm range of the engine can be prevented and fatigue damage due to resonance can be prevented.

It is a second aspect of the invention to provide a blade tensioner that applies tension force to the chain and includes a blade shoe with a chain sliding face, a blade spring that applies a spring force to the blade shoe, and a bracket to which the blade shoe is attached. The fixed end of the blade shoe is rotatably attached to the bracket. The length of the blade spring is shorter than the length of the sliding face of the blade shoe. A first end of the blade spring is attached to the fixed end of the blade shoe and the second end is located apart from the blade shoe and, at the same time, the second end slidably contacts the tip of the bracket. The overall length of the blade spring is shorter than the length of the sliding face of the blade shoe and the second end of the blade spring (i.e. the tip), located apart from the blade shoe, slides on the tip of the bracket. The tip of the bracket is in contact with the second end of the blade spring and the position of this contact point is located between the free and the fixed ends of the blade shoe and, in one example, it is offset from a mid position between the ends of the blade shoe and located nearer to the blade shoe tip.

In this manner, the resonance frequency of the blade tensioner can be set high and, as above, the resonance in the engine rpm range and fatigue damage due to resonance can be prevented.

It is a third aspect of the invention to provide a blade tensioner with a further or second blade spring that runs along the face opposite the chain sliding face of the blade shoe. Thus, the deformation per unit load is small. That is, a blade tensioner with a high spring constant is offered.

It is a fourth aspect of the invention to provide a blade tensioner with a free end or second end of the blade spring curved with the curved face slidably contacting the tip of the bracket. Thus, there is no interference with the bracket tip and deformation of the blade spring is smooth.

It is a fifth aspect of the invention to provide a blade tensioner to apply tension to the chain including a blade shoe with a chain sliding face and a blade spring that is provided on the side opposite the chain sliding face of the blade shoe. The blade spring applies the spring force onto the blade shoe. A bracket is provided on which to attach the blade shoe. The fixed end of the blade shoe is rotatably attached to the bracket. An outward projection is formed at the tip of the bracket or on the blade shoe, at a location approximately midway between the free end of the blade shoe and its fixed end. The projection is adapted to slide on the blade spring or the tip of the bracket depending on whether it is formed on the bracket or the blade shoe.

An outward projection is formed between the tip and fixed end of the blade shoe and the projection slidably contacts the blade spring or bracket tip. The projection at the bracket tip contacts the blade spring or the projection on the blade shoe side contacts the bracket tip and this contact point is located approximately midway between the blade shoe free end and its fixed end. Thereby, the resonance frequency of the blade tensioner can be set high and, as above, the resonance in the engine rpm range and fatigue damage due to the resonance can be prevented.

It is a sixth aspect of the invention to provide a blade tensioner with a projection. The projection has a curved face and the curved face slidably contacts the tip of the bracket or the blade spring. The projection formed on the blade shoe can have a curved face and this curved face slidably contacts the blade spring or bracket tip, thereby deformation of the blade spring can be smooth.

It is a seventh aspect of the invention to provide a blade tensioner which applies a force to the chain and includes a blade shoe with a chain sliding face, a blade spring to apply the spring force onto the blade shoe, and a bracket on which the blade shoe is rotatably attached. The blade spring includes a first blade spring that is provided on the side opposite to the chain sliding face of the blade shoe and a second blade spring which is shorter than the chain sliding face, a first end of which is attached to the fixed end of the blade shoe and the second end is positioned away from the blade shoe. At the same time, the other end of the second blade spring is attached to the projection that is provided to the bracket.

The projection of the bracket contacts the second or free end of the second blade spring and this point of contact is located between the blade shoe free end and its fixed end. Thereby, the resonance frequency of the blade tensioner can be set high and the resonance in the engine rpm range and resulting fatigue damage are prevented.

It is an eighth aspect of the invention to provide a blade tensioner which has a projection on the bracket with a curved portion. The curved portion or face slidably contacts the first blade spring and the projection has an attachment portion or part to which the other end of the second blade spring can be slidably attached.

It should be understood that some embodiments of the present invention contemplate use of a protrusion formed on either the shoe or the bracket portion of the tensioner adapted to bear upon the other element. The protrusion can be located between the ends of the element (the shoe or bracket) upon which it is formed. The location of the protrusion defines the location of the point of contact between the shoe and the bracket. It can be seen that as the point of contact between the shoe and bracket is moved from a location near the middle of the shoe to the end of the shoe the free span of tensioner shoe thus created is lengthened and thus, the natural resonant frequency of the shoe becomes lower. It is therefore an object of the invention to locate the point of contact between the shoe and the bracket via the protrusion operating therebetween at a middle location between the ends of the shoe. Thus, the natural frequency of the shoe is maintained at a higher frequency relative to lower engine vibrations and reduces the susceptibility of the tensioner to damage from resonant vibrations originating from the engine and associated mechanisms.

For a more complete understanding of the invention, one should refer to the embodiments illustrated in greater detail in the drawings and described below by way of examples of the invention.

DETAILED DESCRIPTION OF THE PREFERRED EMBODIMENTS

Figure 1:
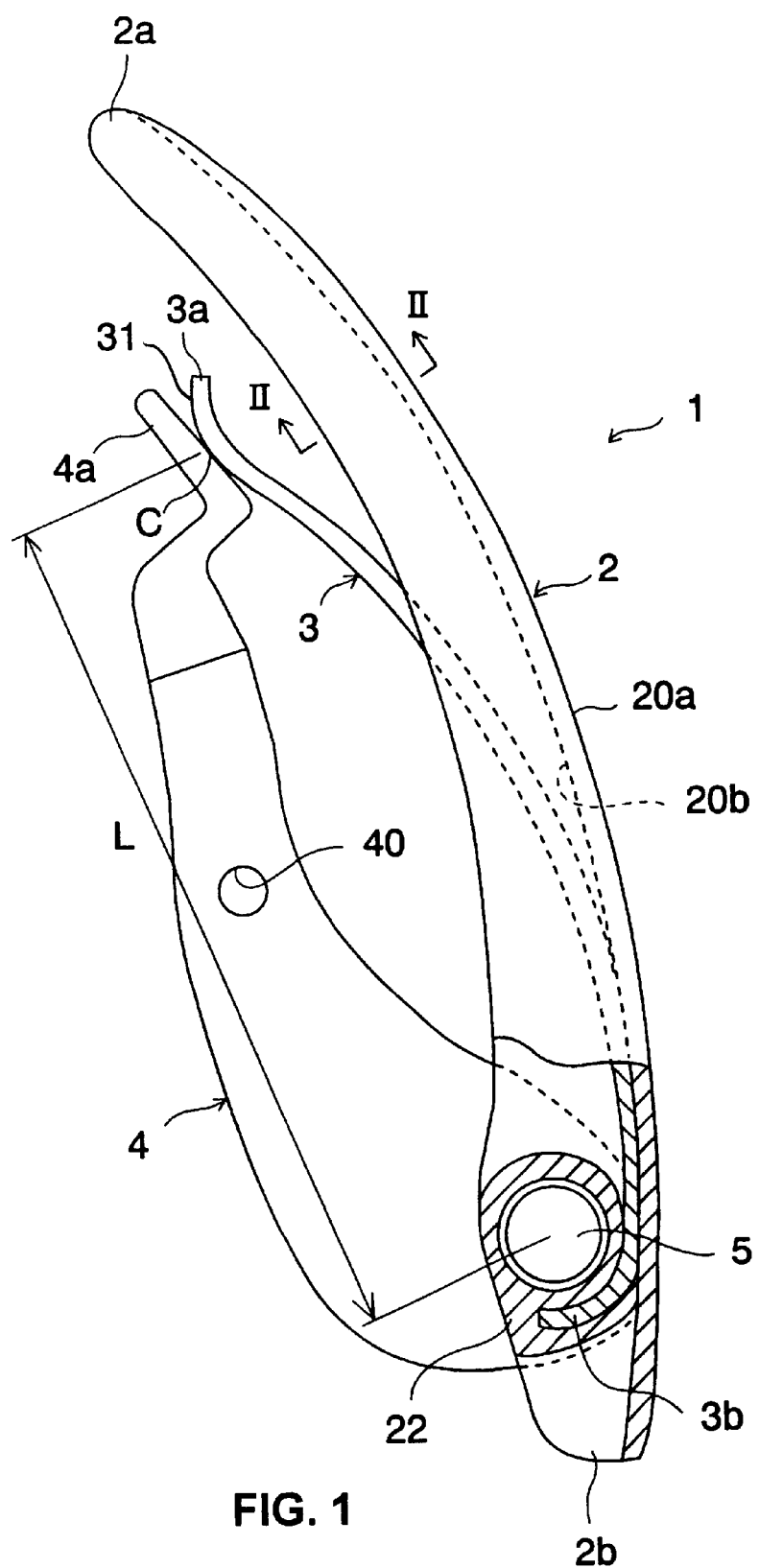
FIG. 1 is a side view of the blade tensioner of a first embodiment of this invention.
Figure 2:
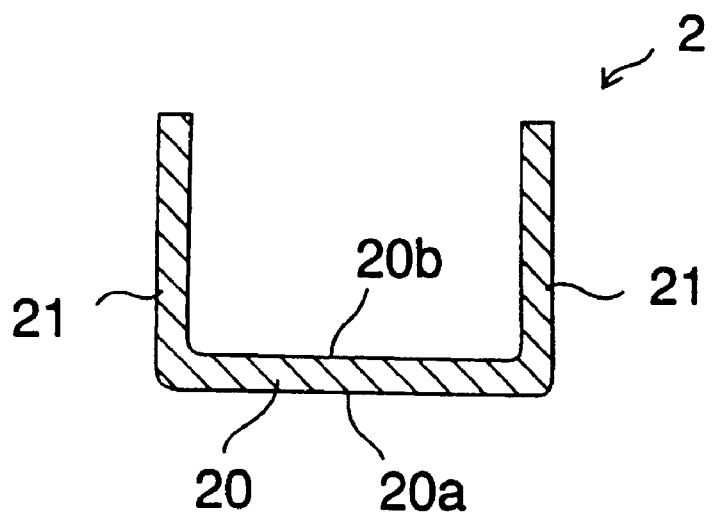
FIG. 2 is the sectional view along line II—II of FIG. 1.

FIG. 1 is a side view of the blade tensioner of the first embodiment of this invention; FIG. 2 is its cross-section along II—II. As shown in FIG. 1, blade tensioner 1 includes a blade shoe 2 of resin which is curved in an arc form, a blade spring 3 that pushes blade shoe 2, and a metal bracket 4 that acts as the bracket to attach blade shoe 2.

As shown in FIG. 2, blade shoe 2 has a generally U-shaped cross-section and is composed of bottom wall 20 and side walls 21 that stand on both its sides. Outer face 20a of bottom wall 20 is a chain sliding face.

Fixed end 2b of blade shoe 2 is attached to bracket 4 rotatably via pin 5. Blade spring 3 separates gradually from inside face 20b of bottom wall 20 of the blade shoe 2 from its rear part 3b, which is in contact with inside face 20b, to its tip 3a and it is curved in an arc form as a whole. The length of blade spring 3 is shorter than blade shoe 2.

Rear part 3b of blade spring 3 is attached to boss 22 formed in fixed end 2b of blade shoe 2 and its tip 3a is placed away from blade shoe 2. Curved face 31 is formed on tip 3a and said curved face 31 contacts tip 4a of bracket 4 slidably. Contact of the tip 4a of bracket 4 with tip 3a of blade spring 3 is made at a point C located between tip 2a and fixed end 2b of blade shoe 2.

Bolt hole 40 in FIG. 1 is a bolt hole for attachment of bracket 4 onto the engine. Blade tensioner 1 is attached by an attachment bolt (not shown) inserted into the bolt hole and by pin 5 to the engine via bracket 4.

Figure 3:
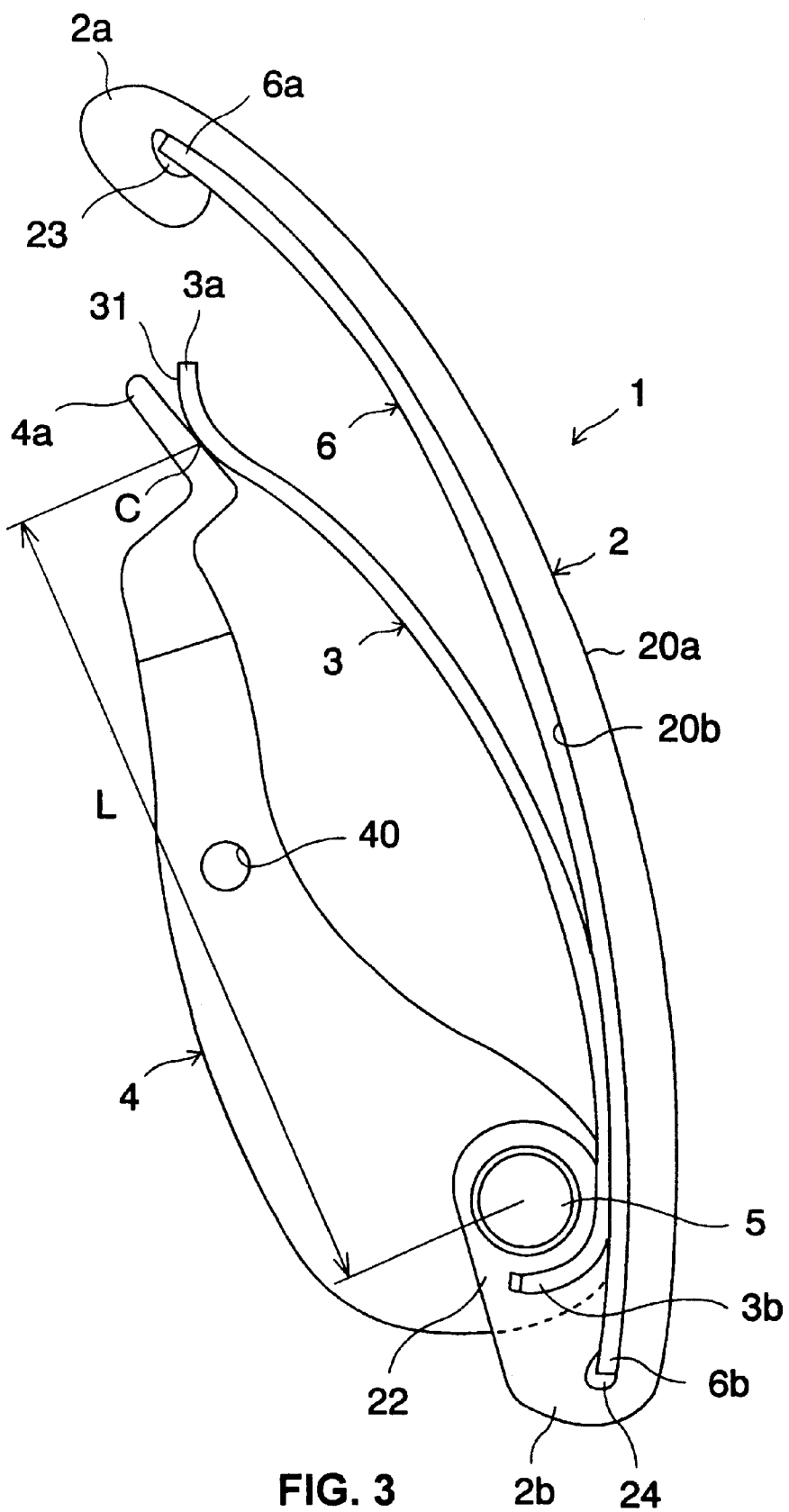
FIG. 3 is a side view of the blade tensioner of the second embodiment of this invention.

FIG. 3 is a side view of the blade tensioner of a second embodiment of this invention and the same reference characters are assigned to the same or corresponding parts as in FIG. 1. Here, the point of provision of the blade shoe and blade spring and the shape of the blade shoe are different from the first embodiment above.

As shown in FIG. 3, blade shoe 2 has a rectangular cross-section and blade spring 6 is mounted on inside face 20b opposite to chain sliding face 20a of blade shoe 2 along the inside face 20b. Tip 6a of blade spring 6 is attached to concavity 23 formed at tip 2a of blade shoe 2 and its rear end 6b is attached to concavity 24 formed at fixed end 2b of blade shoe 2.

In this second embodiment, too, contact between tip 4a of bracket 4 with tip 3a of blade spring 3 is located at a point C approximately midway between tip 2a of blade shoe 2 and its fixed end 2b.

Figure 4:
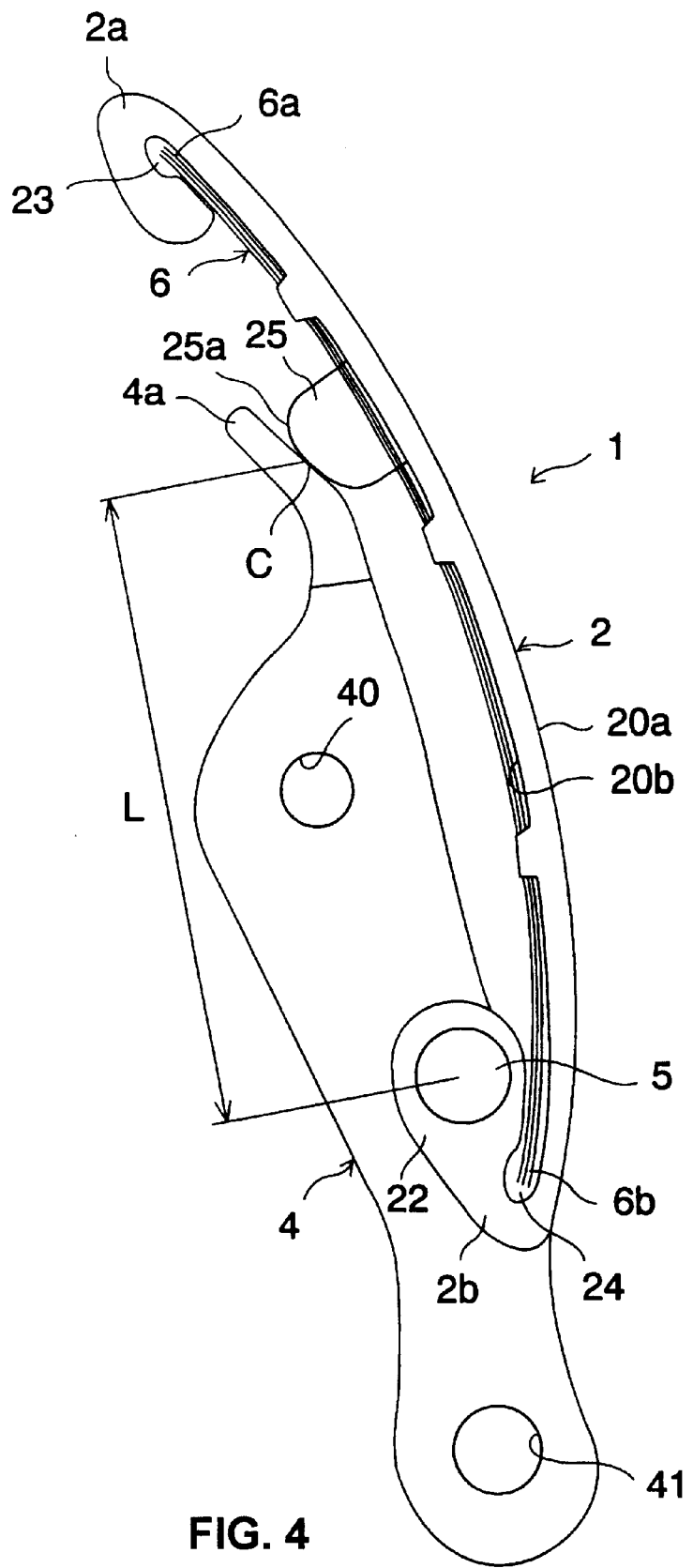
FIG. 4 is a side view of the blade tensioner of the third embodiment of this invention.

FIG. 4 is a side view of the blade tensioner of the third embodiment of this invention and the same or corresponding parts as FIG. 3 are assigned the same reference characters. Here, a projecting member, which is the contact point with the bracket tip, is provided on the side of the blade shoe.

As shown in FIG. 4, a projection 25 projecting toward bracket 4 is formed at the mid point between tip 2a and fixed end 2b of blade shoe 2. Projection 25 has a curved face 25a and the curved face 25a contacts tip 4a of bracket 4 slidably.

Bolt holes 40, 41 permit attachment of the bracket to the engine block. Projection 25 has a curved face 25a and the curved face 25a contacts tip 4a of bracket 4 slidably.

In this third embodiment, contact between tip 4a of bracket 4 with projection 25 is at point C located at the mid point between tip 2a and fixed end 2b of blade shoe 2. Alternately, the projection can be formed at tip 4a of bracket 4, the curved face can be formed on the projection towards blade shoe 2 and the curved face can contact blade spring 6 slidably.

Figure 5:
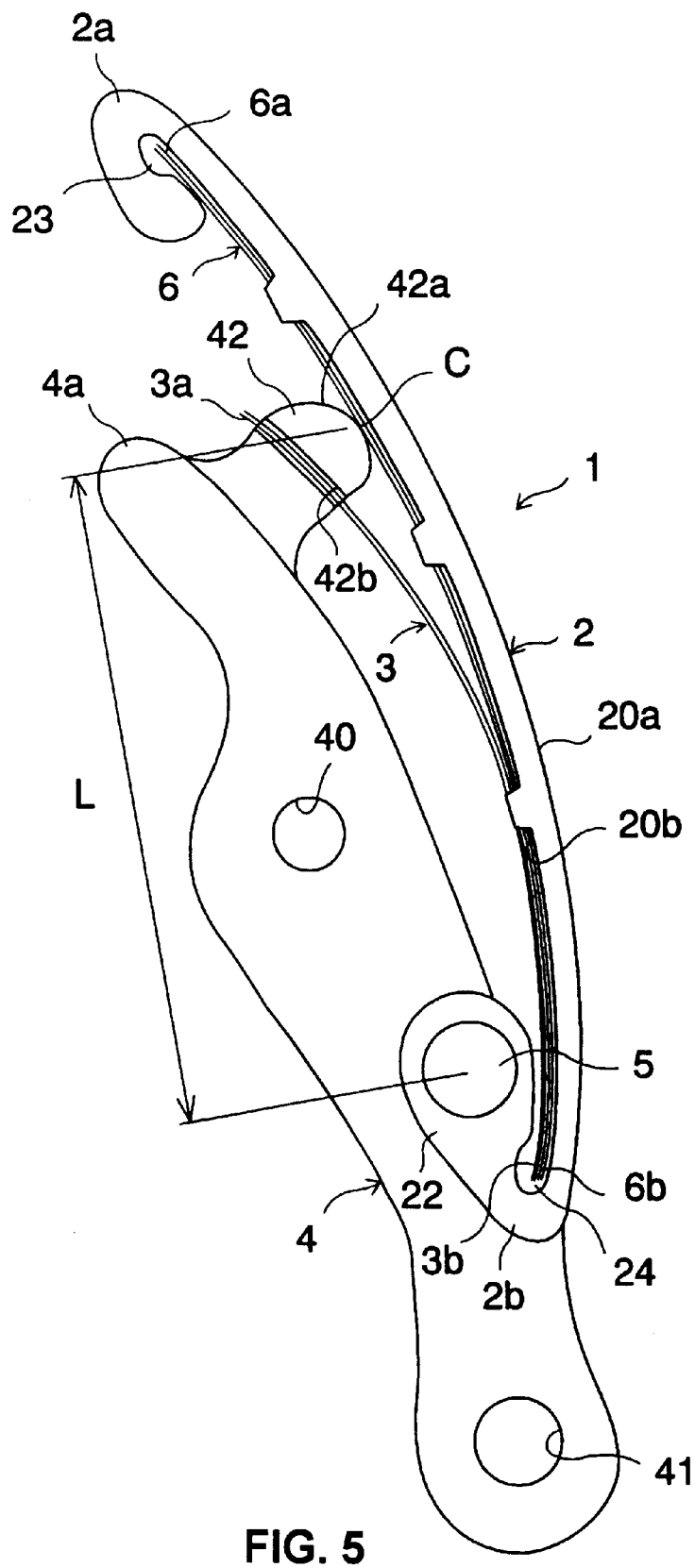
FIG. 5 is a side view of the blade tensioner of the fourth embodiment of this invention.
Figure 6:
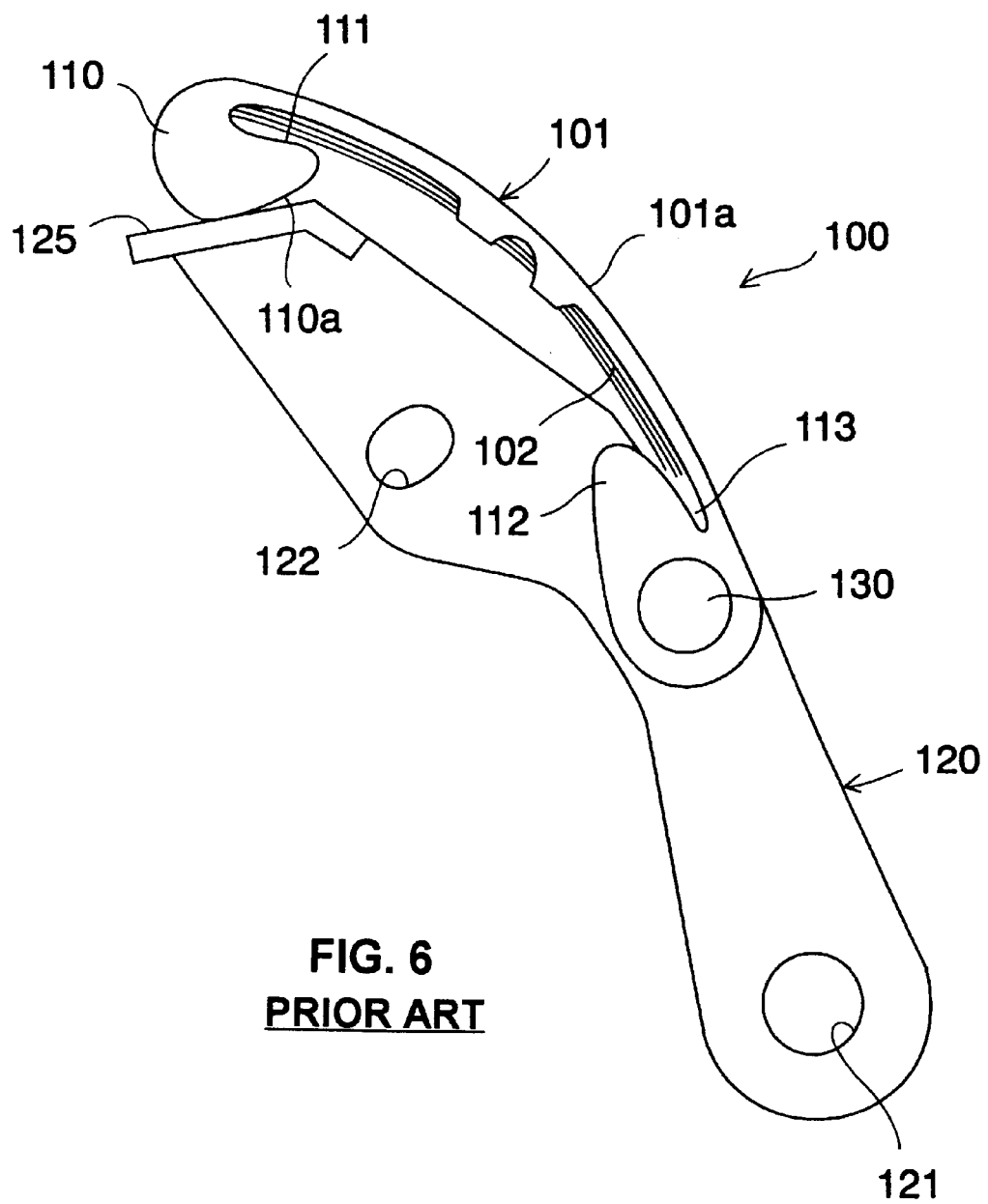
FIG. 6 is a side view of a conventional blade tensioner.

FIG. 5 is a side view of the blade tensioner of the fourth embodiment of this invention and the same or corresponding parts as FIG. 4 are assigned the same reference characters. The projection is provided at the tip of the bracket and additional blade spring are provided. As shown in FIG. 5, projection 42 projecting toward blade shoe 2 is formed at tip 4a of bracket 4. A curved face 42a is formed on projection 42 and the curved face contacts blade spring 6 mounted slidably on blade shoe 2.

Blade spring 3 gradually separates in the lengthwise direction from its rear end 3b to its tip 3a, from inside face 20b, starting from its contact with inside face 20b of blade shoe 2 and it is in an arc-curved form as a whole. The length of blade spring 3 is shorter than the chain sliding face 2a of blade shoe 2. Rear end 3b of blade spring 3 is attached to boss 22 at fixed end 2b of blade shoe 2 and tip 3a is placed away from blade shoe 2 and is attached slidably to throughhole 42b (attachment part) formed on projection 42. Thereby, tip 3a of blade spring 3 is slidable against projection 42 of bracket 4. Incidentally, a groove can be formed instead of through-hole 42b to slidably attach blade spring 3.

In the fourth embodiment, contact of projection 42 of bracket 4 with blade spring 4 on the side of blade shoe 2 is at point C located at or near the mid point between tip 2a and fixed end 2b of blade shoe 2.

When the chain is in operation, the chain runs on chain sliding face 20a of blade shoe 2 and proper tension is applied to the chain by blade shoe 2 as well as the elastic repulsive force of deformed blade springs 3, 6. In such case, the natural frequency of blade tensioner 1 is determined by the position of contact point C. The closer the contact point C is to tip 2a of blade shoe 2, the lower the natural frequency and, conversely, the closer the contact point C is to fixed end 2b of blade shoe 2, the higher the natural frequency of the tensioner.

In the embodiments above, contact point C is located between tip 2a and fixed end 2b of blade shoe 2 and is closer to tip 2a, so that the natural frequency of blade tensioner 1 is relatively high. Thereby, the resonance frequency of blade tensioner 1 can be set high and, as a result, the resonance of blade tensioner 1 in the engine rpm range and the resulting fatigue damage can be prevented.

In the embodiments above, one of two members that contact at contact point C has a curved face (see codes 31, 25a, 42a). Thereby, blade shoe 2 and blade springs 3, 6 do not interfere with other members and their deformation is smooth. As a result, the chain is tensioned properly during its operation.

As detailed above, the blade tensioner contact point of the tip of the bracket with the blade spring or blade shoe is at the mid point between the tip and fixed end of the blade shoe and, thereby, the resonance frequency of the blade tensioner can be set high. As a result, the resonance of the blade tensioner in the engine rpm range and the resulting fatigue damage can be prevented.

In one embodiment, the blade spring of the blade tensioner is shorter than the sliding face of the blade shoe and the other end of the blade spring (i.e. the tip), placed away from the blade shoe, is slidable against the tip of the bracket. The tip of the bracket is in contact with the other end of the blade spring and the contact point is located at the mid point between the tip and fixed end of the blade shoe. Thereby, the resonance frequency of the blade tensioner can be set high and the resonance of the blade tensioner in the engine rpm range and resulting fatigue damage can be prevented.

In another embodiment, an additional blade spring is provided on the face opposite the chain sliding face of the blade shoe, therefore, the amount of deformation per unit load is small, that is, the spring constant of the blade tensioner is high.

In a further embodiment, the other end of the blade spring has a curved face and the curved face contacts the tip of the bracket slidably. In such case, the tip of the bracket does not interfere, so that the deformation of the blade spring is smooth and a proper tension is applied to the operating chain.

In a further embodiment, an outward projection is formed at the tip of the bracket or blade shoe at the mid point between the tip and fixed end of the blade shoe and the projection is provided slidably against the blade spring or bracket tip. The projection at the bracket tip contacts the blade spring or the projection on the side of the blade shoe contacts the bracket tip. This contact point is at the mid point between the tip and fixed end of the blade shoe. Thereby, the resonance frequency of the blade tensioner can be set high and the resonance in the engine rpm range and resulting fatigue damage can be prevented.

In a further embodiment, the projection has a curved face and the curved face slidably contacts the blade spring or bracket tip. Therefore, deformation of the blade spring is made smooth.

In a further embodiment, the blade spring is composed of a first blade spring provided on the face opposite to the chain sliding face of the blade shoe and a second blade spring is provided, which is shorter than the chain sliding face and one end of which is attached to the fixed end of the blade shoe and the other end is located away from the blade shoe. The other end of the second blade spring is attached to the projection of the bracket. The projection of the bracket is attached to the other end of the second blade spring and the contact point is between the tip and the fixed end of the blade shoe. Thereby, similarly to the first embodiment, the resonance frequency of the blade tensioner can be set high and resonance in the engine rpm range and resulting fatigue damage can be prevented.

In a further embodiment, the projection of the bracket has a curved face and the curved face slidably contacts the first blade spring. The projection of the bracket has an attachment part to which the other end of the second blade spring can be slidably attached. Thereby, deformation of the blade spring is smooth.

Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

What is claimed is:

1. A blade chain tensioner comprising:
   a bracket;
   a blade shoe having a chain sliding face and an inside face opposite said sliding face, a fixed end and a free end opposite said fixed end, said blade shoe rotatably disposed on said bracket at said fixed end of said blade shoe;

a resilient blade spring disposed against said inside face of said shoe and biasing said blade shoe toward an associated chain, said blade spring contacting said inside face of said blade shoe at said fixed end of said blade shoe;

a distal end of said bracket contacting said blade spring at a contact point located at an intermediate position between said free end and said fixed end of said blade shoe; and, said second end of said blade spring has a curved face, said curved face contacting slidably with said distal end of said bracket.

2. The blade chain tensioner of claim 1 wherein:

said blade spring has a length shorter than a length of the sliding face of said blade shoe, a first end of said blade spring being attached onto said fixed end of said blade shoe, a second end of said blade spring being disposed apart from said blade shoe and slidable on said distal end of said bracket.

3. The blade chain tensioner of claim 2 further comprising a second blade spring disposed along a face opposite said chain sliding face of said blade shoe.

4. A blade chain tensioner comprising:

a bracket; a blade shoe having a chain sliding face, a fixed end and a free end opposite said fixed end, said blade shoe rotatably disposed on said bracket on said fixed end of said blade shoe;

a blade spring provided at a face opposite the chain sliding face of said blade shoe, said blade spring urging said blade shoe toward an associated chain, and a protrusion being formed on a distal end of said bracket extending to an intermediate position between said free end of said blade shoe and said fixed end thereof, said protrusion being slidable onto said blade spring.

5. The blade chain tensioner of claim 4 wherein said protrusion has a curved face, said curved face slidably contacting said blade spring.

6. The blade chain tensioner of claim 4 wherein said protrusion is formed in said blade shoe between said free end and said fixed end of said blade shoe, said protrusion being slidable onto said distal end of said bracket.

7. The blade chain tensioner of claim 4 wherein: said blade spring includes a first blade spring provided on a face opposite said chain sliding face of said blade shoe, and a second blade spring having a shorter length than a length of said chain sliding face, a first end of said second blade spring being attached onto said fixed end of said blade shoe, and a second end of said second blade spring being disposed apart from said blade shoe, said second end of said second blade spring being fitted onto a protrusion provided on said bracket.

8. The blade chain tensioner of claim 7 wherein said protrusion of said bracket has a curved face, said curved face slidably contacting said first blade spring, said protrusion having a fitting portion onto which said second end of said second blade spring is slidably fitted.

* * * * *